(12) United States Patent
Beyeler et al.

(10) Patent No.: US 8,984,966 B2
(45) Date of Patent: Mar. 24, 2015

(54) SUB-MILLINEWTON CAPACITIVE MEMS FORCE SENSOR FOR MECHANICAL TESTING ON A MICROSCOPE

(71) Applicant: Femtotools AG, Buchs ZH (CH)

(72) Inventors: Felix Beyeler, Regensdorf (CH); Simon Muntwyler, Zurich (CH); Wolfgang Dietze, Maienfeld (CH)

(73) Assignee: Femtotools AG, Buchs ZH (CH)

( * ) Notice: Subject to any disclaimer, the term of this patent is extended or adjusted under 35 U.S.C. 154(b) by 0 days.

(21) Appl. No.: 14/347,421

(22) PCT Filed: Sep. 20, 2012

(86) PCT No.: PCT/EP2012/068539
§ 371 (c)(1),
(2) Date: Mar. 26, 2014

(87) PCT Pub. No.: WO2013/050252
PCT Pub. Date: Apr. 11, 2013

(65) Prior Publication Data
US 2014/0230576 A1 Aug. 21, 2014

(30) Foreign Application Priority Data

Oct. 4, 2011 (EP) .................................... 11183816

(51) Int. Cl.
*G01L 1/14* (2006.01)
*G01L 5/00* (2006.01)
*G01L 5/16* (2006.01)

(52) U.S. Cl.
CPC ............... *G01L 1/148* (2013.01); *G01L 5/0057* (2013.01); *G01L 5/165* (2013.01)
USPC .................................................. 73/862.626

(58) Field of Classification Search
CPC ......... G01L 5/00; G01L 5/0057; G01L 5/165; G01Q 70/10
USPC .............. 73/105, 862.621, 862.625, 862.626; 850/52, 57, 62, 63
See application file for complete search history.

(56) References Cited

U.S. PATENT DOCUMENTS 5,992,225 A * 11/1999 Shirakawabe et al. ........... 73/105
6,073,484 A * 6/2000 Miller et al. ..................... 73/105
(Continued)

FOREIGN PATENT DOCUMENTS

DE         4107605 C1    4/1994
WO      2005121812 A1  12/2005
(Continued)

OTHER PUBLICATIONS

Sun et al, "MEMS Capacitive Force Sensors for Cellular and Flight Biomechanics," Biomedical Materials, Mar. 2, 2007, vol. 2, No. 1, pp. 16-22, Institute of Physics Publishing.
Guan et al, "An Electrothermal Microactuator with Z-Shaped Beams," Journal of Micromechanics and Microengineering, Jul. 8, 2010, vol. 20, No. 8, pp. 1-9, IOP Publishing.
(Continued)

*Primary Examiner* — Daniel S Larkin
(74) *Attorney, Agent, or Firm* — Murphy, Bilak & Homiller, PLLC (57) ABSTRACT

Most mechanical tests (compression testing, tensile testing, flexure testing, shear testing) of samples in the sub-mm size scale are performed under the observation with an optical microscope or a scanning electron microscope. However, the following problems exist with prior art force sensors as e.g they cannot be used for in-plane mechanical testing (a- and b-direction) of a sample; they cannot be used for vertical testing (c-direction) of a sample. In order to overcome the before mentioned drawbacks the invention comprises the following basic working principle: A force is applied to the probe (2) at the probe tip (1) of the sensor. The force is transmitted by the sensor probe (2) to the movable body (3) of the sensor. The movable body is elastically suspended by four folded flexures (4), which transduce the force into a deflection dx. This deflection is measured by an array of capacitor electrodes, called capacitive comb drive (6).

6 Claims, 7 Drawing Sheets

(56) References Cited

U.S. PATENT DOCUMENTS

| | | | |
|---|---|---|---|
| 6,358,426 B1 * | 3/2002 | Muramatsu et al. | 216/11 |
| 6,405,584 B1 * | 6/2002 | Bindell et al. | 73/105 |
| 6,415,653 B1 * | 7/2002 | Matsuyama | 73/105 |
| 7,022,976 B1 * | 4/2006 | Santana et al. | 250/234 |
| 7,337,656 B2 * | 3/2008 | Shirakawabe et al. | 73/105 |
| 7,421,899 B2 * | 9/2008 | Workman et al. | 73/579 |
| 2004/0139808 A1 | 7/2004 | Keller | |
| 2007/0251328 A1 | 11/2007 | Selvan et al. | |

FOREIGN PATENT DOCUMENTS

| | | |
|---|---|---|
| WO | 2007147239 A1 | 12/2007 |
| WO | 2010112242 A1 | 10/2010 |

OTHER PUBLICATIONS

Beyeler et al, "Design and Calibration of a MEMS Sensor for Measuring the Force and Torque Acting on a Magnetic Microrobot," Journal of Micromechanics and Microengineering, Dec. 11, 2007, pp. 1-7, vol. 18, IOP Publishing.

Muntwyler et al, "Monolithically Integrated Two-Axis Microtensile Tester for the Mechanical Characterization of Microscopic Samples," IEEE/ASME Journal of Microelectromechanical Systems, Oct. 2010, vol. 19, No. 5, pp. 1223-1233.

Beyeler et al, "Monolithically Fabricated Microgripper with Integrated Force Sensor for Manipulating Microobjects and Biological Cells Aligned in an Ultrasonic Field," IEEE/ASME Journal of Microelectromechanical Systems, Feb. 2007, vol. 16, No. 1, pp. 7-15.

* cited by examiner

SUB-MILLINEWTON CAPACITIVE MEMS FORCE SENSOR FOR MECHANICAL TESTING ON A MICROSCOPE

The present invention relates to a capacitive micro force sensor.

BACKGROUND

Multiple methods for measuring force from the nanonewton ($10^{-9}$N) to millinewton ($10^{-3}$N) range exist such as atomic force microscopes, microscales, piezoresistive cantilevers and capacitive force sensors. These systems have been successfully used in different application fields including material science, microsystem development, nanotechnology, biological research, medical research, thin film characterization and quality control of miniaturized systems. Using these sensors in combination with a precise positioning device such as a micromanipulator, allows building compression and tensile testing systems for mechanical testing at the microscale.

Capacitance is a measure of the electrical charge between two conductors separated by an air gap. A load applied to the sensor causes a deflection. As the conductors are moved closer to or farther from one another, the air gap changes, and so does the capacitance. The principle of capacitive micro force sensing is simple and effective and features an excellent sensitivity. MEMS fabrication technology allows the efficient fabrication of such sensors [1]. Due to the single-crystalline silicon structure of the sensor, the results are highly repeatable and the sensors are less likely to degrade over time. Capacitive MEMS force sensor designs are detailed in [1-3] and provided as a commercial product [4].

PROBLEMS TO BE SOLVED

Figure 4A:
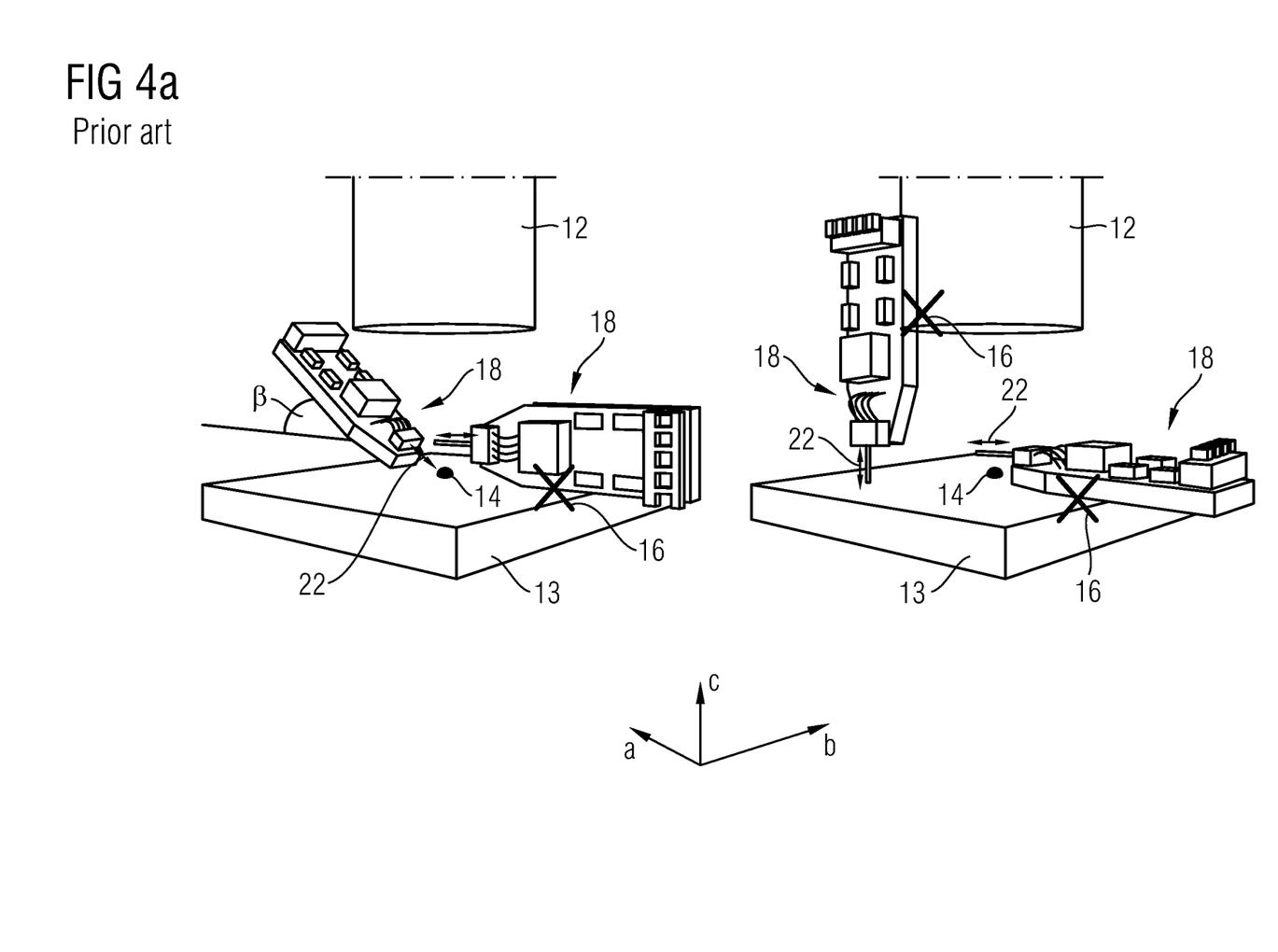
FIG. 4a depicts the mechanical testing using prior art sensors.

Most mechanical tests (compression testing, tensile testing, flexure testing, shear testing) of samples in the sub-mm size scale are performed under the observation with an optical microscope or a scanning electron microscope as shown in FIG. 4a. Capacitive MEMS sensors have shown their suitability for small scale metrology and their design as described in [1, 2]. However, the following problems exist with prior art force sensors 18:

a) Prior art sensors 18 cannot be used for in-plane mechanical testing (a- and b-direction) of the sample 14. The reason is that when aligning the sensitive direction 22 horizontally (a-b plane), the prior art sensors 18 will touch the sample holder 13, making the measurement impossible. The contact point 16 is shown in Figure (FIG.) 4a.

b) Prior art sensors 18 cannot be used for vertical testing (c-direction) of the sample 14. The reason is that when aligning the sensitive direction 22 vertically (c-direction), the prior art sensors 18 will touch the microscope lens 12, making the measurement impossible. The contact point 16 is shown in FIG. 4a.

c) Prior art sensors may be used in combination with a long range stereomicroscope. However, the alignment of the prior art sensor 18 relative to the sample 14 is difficult, since the sensor will cover large parts of the field of view of the microscope. An observation of the sample 14 during the measurement is not possible. This covering of the line of sight 15 inhibits the observation of the sample 14 during testing. However, the visual information during the test is of great importance to observe physical processes such as crack propagation, viscoelasticity, structure failure or plastic deformation.

d) It is possible to perform measurements using existing force sensors 18 at an angle 13 without touching the microscope lens 12 or the sample holder 13 as shown in FIG. 4a. However, the measurement data is difficult to interpret since the force components in the a-, b- and c-direction cannot be measured directly and independently.

PRIOR ART

Documents [1, 2] describe a comb drive based capacitive sensor design featuring a sensor probe which is overhanging the substrate on one side. The direction in which the prior art force sensor 18 is sensitive is parallel to the sensor probe as shown in FIG. 4a. This design is suitable for the mechanical testing of a sample 14 under the microscope lens 12 at an angle 13.

However, measurements in horizontal (a-b-plane) or vertical direction (c-axis) are often times not possible due to the shape of the substrate and the sensor chip geometry. For some applications capacitive multi-axis force sensors according to [3,7] are used to have a higher flexibility and decompose force vectors into the a-, b- and c-axis components. However, multi-axis force sensors are difficult to calibrate at the sub-Millinewton range and therefore highly expensive.

Prior art sensor designs described in [1]-[9] do not feature a probe (2) which is overhanging the substrate (7) on two sides (8,9), limiting the number of applications for which the sensor can be used due to geometrical limitations.

Simply mounting the prior art MEMS sensor chips rotated such that the sensor probe 2 is overhanging the substrate 7 one side does not solve the problem since the substrate 7 and the whole MEMS sensor chip are inside the line of sight 15 and are therefore blocking a large part of the microscope view. Also, this configuration is not suitable since the substrate touches the microscope lens 12 making the measurement impossible.

DETAILED DESCRIPTION

For a more complete understanding of the present disclosure, and the advantages thereof, reference is now made to the following descriptions taken in conjunction with the accompanying drawings, in which.

Figure 1:
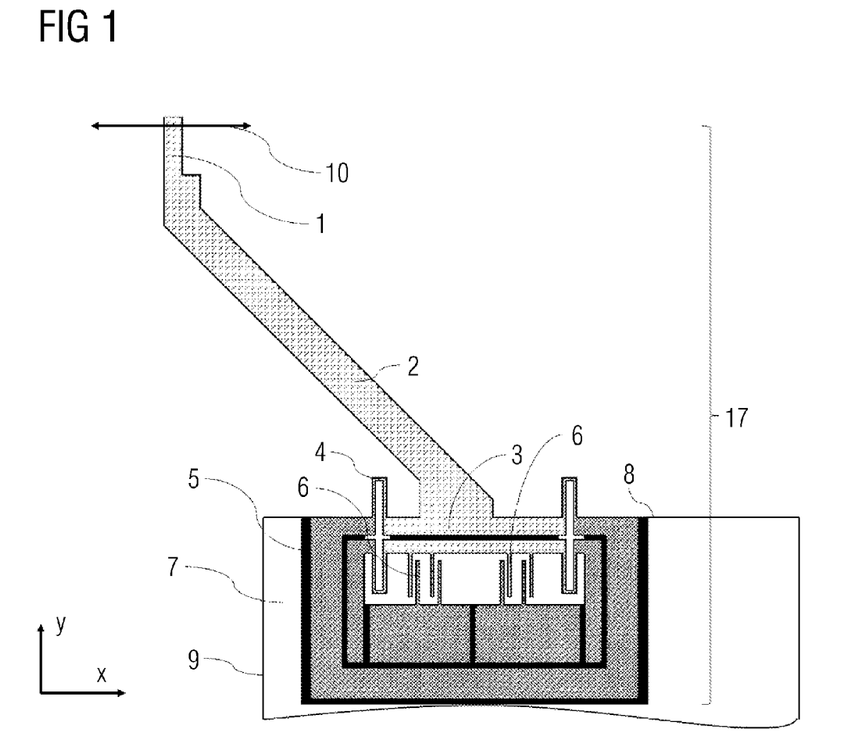
FIG. 1 depicts a capacitive MEMS sensor in a schematic view.
Figure 3:
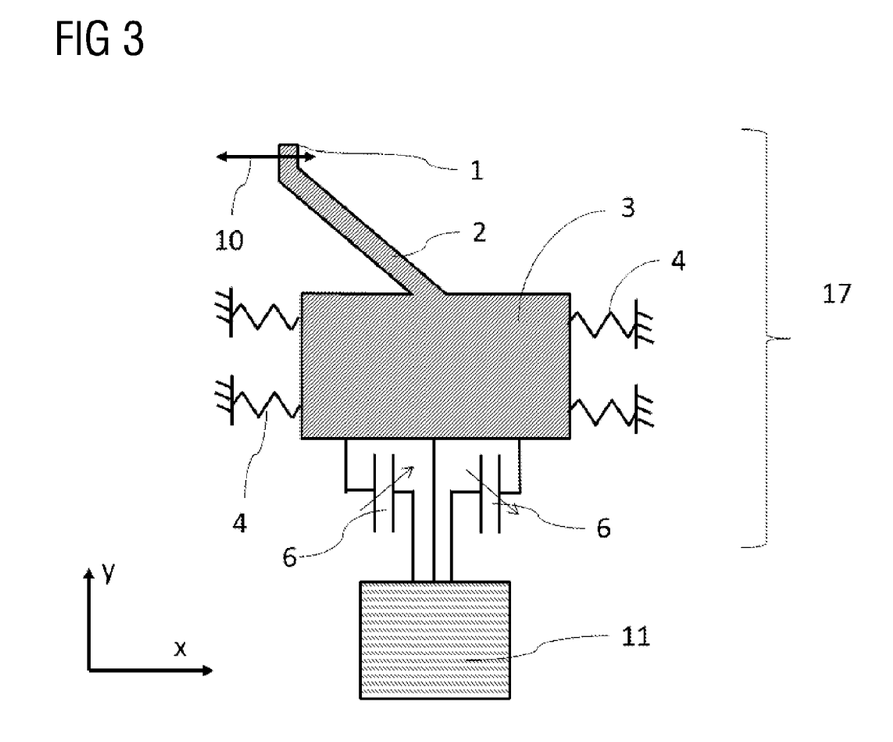
FIG. 3 depicts the electrical and mechanical sensor buildup.

FIG. 1 shows a schematic view of the force sensor design. FIG. 3 shows the electrical and mechanical buildup. The basic working principle is the following: A force is applied to the probe 2 at the probe tip 1 of the sensor. The force is transmitted by the sensor probe 2 to the movable body 3 of the sensor. The movable body 3 is elastically suspended by four folded flexures 4, which transduce the force into a deflection dx. This deflection dx is measured by an array of capacitor electrodes, called capacitive comb drive 6. A configuration of two comb drives 6 may be used for differential measurements. The restoring force Fr for the folded flexure design is given by $$F_r = 2\frac{Etw^3}{l_s^3}dx,$$

where $l_s$ is the length of the sensor's flexures, E the Young's Modulus of silicon, t the thickness of the flexures, w the width of the flexures of the sensor and dx the deflection. The electrical capacitance $C_1$ and $C_2$ of the comb drive formed between the movable, common electrode 24 and the non-movable electrode 25 is given by $$C_1 = C_2 = n\varepsilon\frac{l_c t}{d_1} + n\varepsilon\frac{l_c t}{d_2},$$

where n is the number of comb drive fingers, $l_c$ the length of the comb drive fingers, $d_1$ the small gap of the capacitor electrodes and $d_2$ the spacing between a capacitor electrode pair. The deflection dx changes the capacitances to $$C_1 = \varepsilon\frac{l_c t}{d_1 - dx} + \varepsilon\frac{l_c t}{d_2 + dx}$$

and $$C_2 = \varepsilon\frac{l_c t}{d_1 + dx} + \varepsilon\frac{l_c t}{d_2 - dx}.$$

The change in capacitance is converted into an output voltage by the readout electronics. The readout electronics with the interface IC 11 is located directly in the sensor package 20. Locating the interface IC as close as possible to the MEMS sensor chip 17 is important to minimize the amount of parasitic capacitance. Parasitic capacitance would reduce the quality of the output signal of the interface IC 11. The range, sensitivity and resolution of the sensing system are easily varied by changing the length $l_s$ of the flexures.

The sensor package consists of the MEMS sensor chip 17, the interface IC 11 and the substrate 7. The MEMS fabrication process is detailed in the documents [1, 6, 7 and 9]. Silicon or silicon-on-insulator wafers are used as a base material. However, fabricating the sensor chip 17 using a metal by electroplating or laser-cutting may also be possible. The fabrication process described in documents [6, 7] enables the sensor probe to be electrically insulated from the rest of the MEMS chip. Therefore, the probe may be used for simultaneous electrical measurements or for applying a current or electrical signal to the sample 14.

Figure 2A:
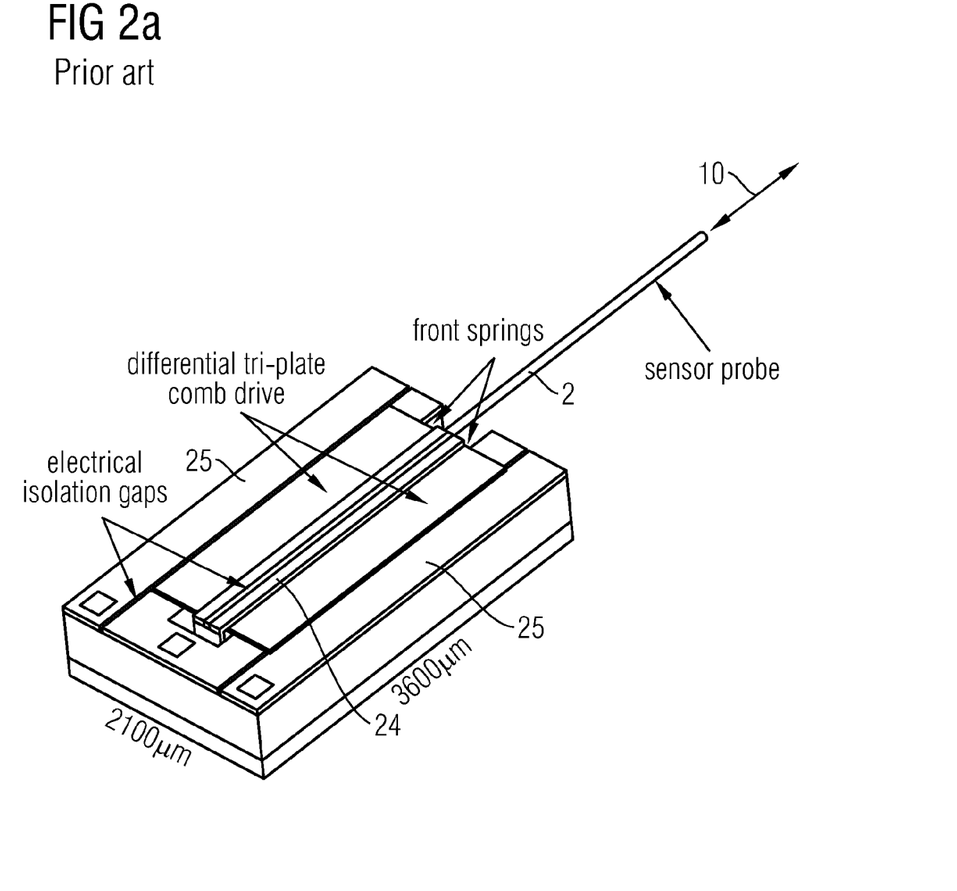
FIG. 2a depicts a depicts a prior art sensor by Sun Yu et al.
Figure 2B:
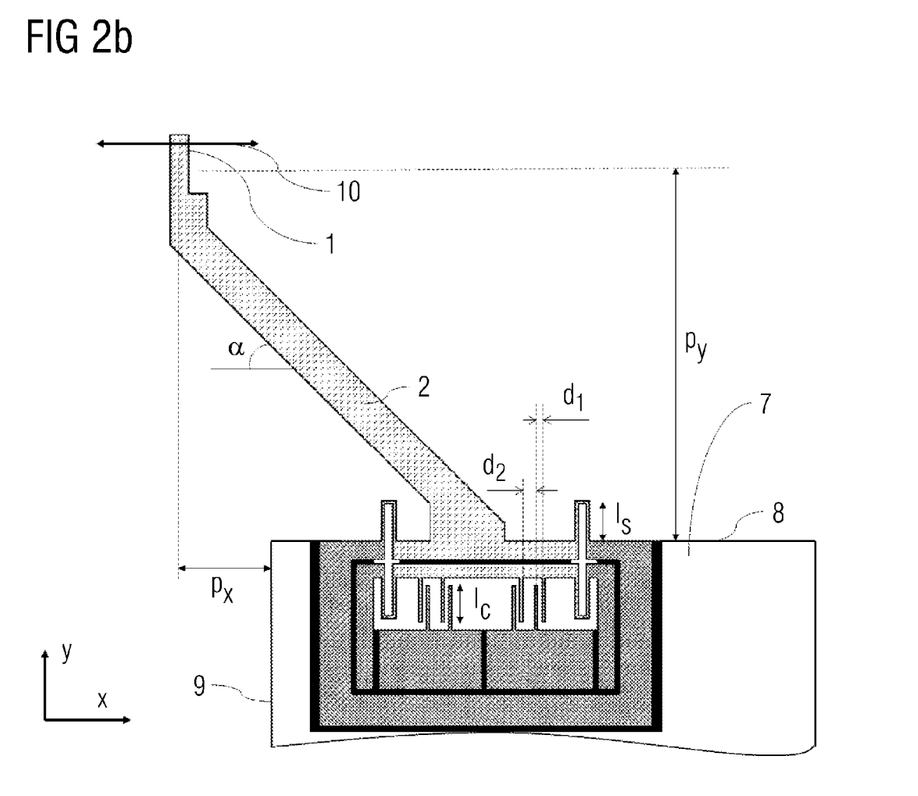
FIG. 2b depicts a capacitive MEMS sensor with some geometrical indications.

In the state of the art sensor design described in [1], the movable, common electrode 24 is located in the middle between the non-movable electrodes 25, forming a differential capacitive comb drive as shown in FIG. 2a. The MEMS sensor chip 17 according to a preferred embodiment of the invention features a different comb drive configuration as shown in FIG. 2b. The non-movable electrodes 25 are moved to the same side next to each other also forming a differential comb drive. The new configuration is advantageous for reducing the MEMS sensor chip 17 size in the y-direction and for wire-bonding the MEMS sensor chip 17 to the substrate 7 by reducing the length of the wires.

After MEMS chip fabrication, the MEMS sensor chip 17 is mounted onto a substrate 7, which is normally a printed circuit board 7 which also includes the interface IC and the rest of the readout electronics 11. The sensor chip is located at the upper edge of the substrate 7 (substrate edge 8) and at the right or the left edge (substrate edge 9). The sensor is wire-bonded to the substrate. The sensor probe 2 is designed such that its probe tip 1 is overhanging two sides 8, 9 of the substrate 7 by the distance $p_x$ and $p_y$, respectively as shown in FIG. 2b. This is realized by introducing an angle α into the MEMS design or by choosing a bent probe shape. The values $p_x$ and $p_y$ can range from single micrometers of to several millimeters. The fact that the sensor probe is overhanging both substrate side 8 and substrate side 9, allows the sensor to be used for a much higher number of applications. The sensor is used in combination with an optical microscope or a scanning electron microscope to observe the alignment of the sensor probe tip 1 and the sample 14.

Figure 4B:
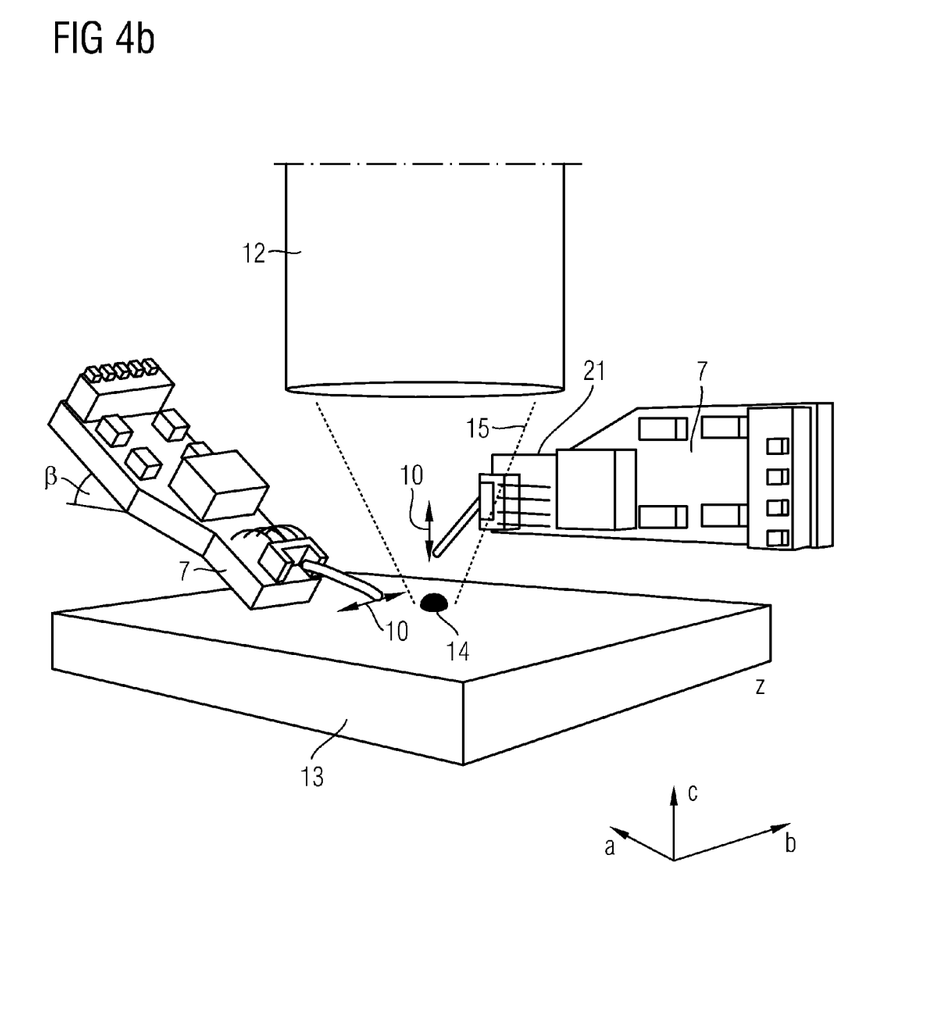
FIG. 4b depicts the mechanical testing using the sensor design according to the invention.

In most cases the capacitive MEMS force sensors are used in combination with a precise micropositioning device, such as a micromanipulator. The sensor can be mounted in different, adjustable orientations as shown in FIG. 4b. The way the sensor is mounted on the micromanipulator depends on the desired sensing direction for a certain application. Some measurement tasks require the application of the force to the sample 14 in a vertical direction (c-direction). Other applications require the application of the force to the sample 14 in a horizontal direction (a-b-plane).

For vertical measurements the sensitive direction 10 of the sensor is aligned with the c-axis. The substrate 7 may have a cutout 21 such that the sensor can also be used in the limited space available underneath the microscope lens 12 and above the sample holder 13. For measurements in the a-b-plane the sensor is mounted at an angle β as shown FIG. 4b. The angle β can be altered without changing the sensitive direction 10 which is a great advantage compared to prior art sensor designs since it simplifies the experimental setup, the application of the force in the a- direction or b-direction and the interpretation of the measurement data.

Comparison to Existing Sensor Designs

Figure 5A:
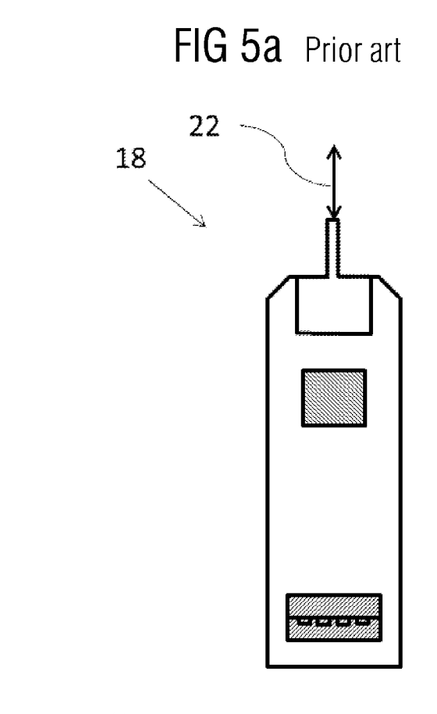
FIG. 5a depicts a prior art sensor.
Figure 5B:
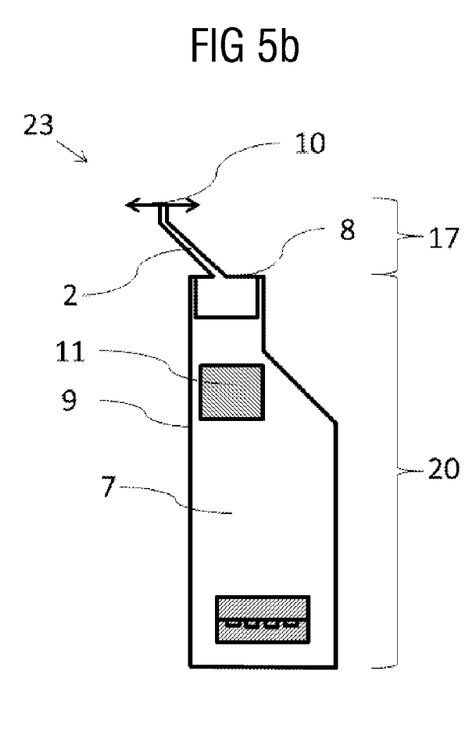
FIG. 5b depicts an embodiment of the invention.
Figure 5C:
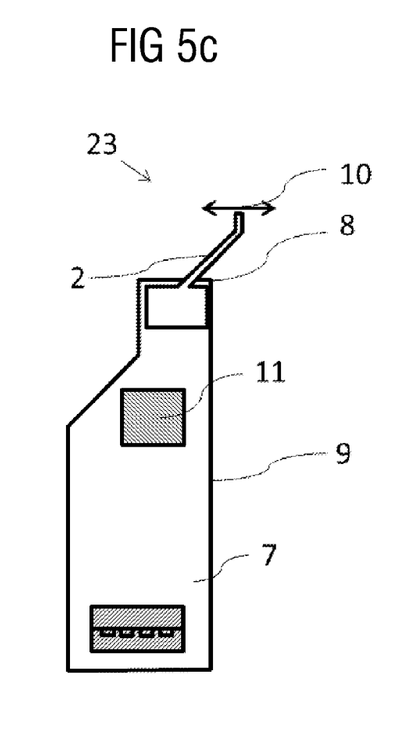
FIG. 5c depicts an alternative embodiment of the invention.

FIGS. 5a . 5c compares the prior art sensor design 18 with the sensor proposed according to the invention. The sensitive direction of the prior art sensor 22 is parallel to the sensor probe as shown in FIG. 5a. Also, the sensor probe is parallel to the long axis of the substrate. This is not the case in the new sensor 23 design shown in FIG. 5b and FIG. 5c. The sensitive axis is perpendicular to the long-axis of the sensor package 20 and the probe tip 1. Also it can be seen that the sensor probe of the prior art sensor 18 is overhanging one side of the substrate only. In the new sensor 23 the probe is overhanging two sides 8, 9 of the substrate 7. This is the upper substrate edge 8 and one of the adjacent substrate edges 9 of the upper substrate edge 8. This adjacent edge of the substrate 9 can be on the right or left side of the substrate 7. In the prior art sensor design the probe is straight, while the probe 2 of the new sensor 23 is tilted at an angle α as shown in FIG. 2b. The sensitive direction 10 is perpendicular to the long axis of the substrate 7 (x-axis in FIGS. 5a, 5b, 5c). The prior art sensor features a sensitive direction parallel to the substrate edge 9 (left or right side), the new sensor features a sensitive direction parallel to substrate edge 8 (upper substrate edge). The MEMS sensor chip is located at the edge of two adjacent substrate sides 8, 9.

When looking at FIGS. 5a . . . 5c, it can be seen that for the prior art sensor 18 the sensitive direction of the prior art sensor 22 changes with the angle β. This means that the force vector applied to the sample 14 changes with the angle β as well. This is a disadvantage, since for a meaningful measurement the applied force should either be in the a-direction, b-direction or c-direction. FIG. 4b shows that the sensitive direction 10 (and therefore the applied force vector) does not change with the angle f3 when using the new sensor 23. The mounting configuration in FIG. 4b shows also that a small part of the field of view of the microscope is covered by the new sensor 23 only.

LIST OF USED REFERENCE NUMERALS AND ACRONYMS 1 sensor probe tip
2 sensor probe
3 movable part of the sensor
4 flexures
5 non-movable part of the sensor
6 capacitive comb drive
7 substrate
8 edge of the substrate
9 edge of the substrate
10 sensitive direction
11 interface integrated circuit
12 microscope lens
13 sample holder
14 sample
15 line of sight
16 point of contact
17 MEMS sensor chip
18 prior art sensor
21 cutout in the substrate
22 sensitive direction of the prior art sensor
23 new force sensor
px distance from probe tip to substrate edge in x-direction
py distance from probe tip to substrate edge in y-direction
d1 air gap between capacitor electrodes
d2 air gap between capacitor electrode pairs
dx deflection of the movable part of the sensor
ls length of flexure
lc length of capacitor electrodes
t thickness of chip device layer, flexures and capacitor electrodes
w width of the flexure
E Young's Modulus
Fr restoring force
MEMS Microelectromechanical System
Ic integrated circuit
α angle of sensor probe
β angle of substrate

LIST OF CITED DOCUMENTS

[1] Y. Sun, B. J. Nelson, "MEMS Capacitive Force Sensors for Cellular and Flight Biomechanics", Biomedical Materials, Vol. 2, No. 1, 2007, pp. 16-22.
[2] WO 2010/112242 A1,
   <<PACKAGE AND INTERFACE OF A MICROFORCE SENSOR FOR SUB-MILLINEWTON ELECTROMECHANICAL MEASUREMENTS>>
   Applicant: FemtoTools GmbH
[3] WO 2005/121812 A1
   <<MULTI-AXIS CAPACITIVE TRANSDUCER AND MANUFACTURING METHOD FOR PRODUCING IT>>
   Applicant: ETH ZURICH
[4] FemtoTools AG, http://www.femtotools.com
[5] WO 2007/147239 A1
   <<MEMS-BASED MICRO AND NANO GRIPPERS WITH TWO-AXIS FORCE SENSORS>>
   Applicant: SUN, Yu; KIM, Keekyoung
[6] F. Beyeler, A. P. Neild, S. Oberti, D. J. Bell, Y. Sun, J. Dual, B. J. Nelson "Monolithically Fabricated Micro-Gripper with Integrated Force Sensor for Manipulating Micro-Objects and Biological Cells Aligned in an Ultrasonic Field" IEEE/ASME Journal of Microelectromechanical Systems, Vol. 16, No. 1, February 2007, pp. 7-15.
[7] F. Beyeler, S. Muntwyler, Z. Nagy, C. Graetzel, M. Moser, B. J. Nelson, "Design and calibration of a MEMS sensor for measuring force and torque acting on a magnetic microrobot" Journal of Micromechanics Microengineering, Vol. 18, 2008, pp 7.
[8] US 2007/0251328 A1
   <<FORCE SENSOR PACKAGE AND METHOD OF FORMING THE SAME>>
   Applicants: Thirumani A. Selvan; Raghu Sanjee.
[9] S. Muntwyler, B. E. Kratochvil, F. Beyeler, B. J. Nelson, "Monolithically Integrated Two-Axis Microtensile Tester for the Mechanical Characterization of Microscopic Samples", IEEE/ASME Journal of Microelectromechanical Systems (JMEMS), Vol. 19, No. 5, October 2010, pp. 1223-1233

The invention claimed is:

1. A single-axis capacitive MEMS force sensor for sub-Millinewton force sensing, comprising:
   a sensor probe with a probe tip on which the force is applied, the sensor probe configured to transmit the force to a movable body;
   at least one comb drive for capacitive measurement of an amount of deflection of the moveable body in response to the force transmitted by the sensor probe, the at least one comb drive comprising two non-movable capacitor electrodes located next to each other and a movable common electrode;
   a substrate for supporting the sensor probe and the at least one comb drive,
   wherein the probe tip of the sensor probe overhangs the substrate on two adjacent sides of the substrate,
   wherein the two non-movable capacitor electrodes and the movable common electrode form a differential comb drive.

2. The single-axis capacitive MEMS force sensor of claim 1, further comprising a capacitive interface integrated circuit located directly on the substrate.

3. The single-axis capacitive MEMS force sensor of claim 1, wherein the probe tip of the sensor probe overhangs the substrate on an upper edge of the substrate and an edge of the substrate adjacent the upper edge.

4. The single-axis capacitive MEMS force sensor of claim 1, wherein the sensor probe is tilted at an angle with respect to an upper edge of the substrate.

5. The single-axis capacitive MEMS force sensor of claim 1, wherein the sensor probe has a sensitive direction parallel to an upper edge of the substrate.

6. The single-axis capacitive MEMS force sensor of claim 5, wherein the sensitive direction remains fixed regardless of a mounting angle of the sensor probe.

* * * * *